United States Patent [19]

Degger et al.

[11] 4,295,625

[45] Oct. 20, 1981

[54] PRECISION ADJUSTING DEVICE

[75] Inventors: Wolter W. J. Degger; Adrianus C. Van Kasteren, both of Eindhoven, Netherlands

[73] Assignee: U.S. Philips Corporation, New York, N.Y.

[21] Appl. No.: 58,413

[22] Filed: Jul. 18, 1979

[30] Foreign Application Priority Data

Jul. 31, 1978 [NL] Netherlands ................... 7808045

[51] Int. Cl.³ .............................................. A47F 7/14
[52] U.S. Cl. ................................. 248/466; 248/475 R
[58] Field of Search .................. 248/466, 475 R, 476; 350/252, 255; 151/41.74

[56] References Cited

U.S. PATENT DOCUMENTS

| | | | |
|---|---|---|---|
| 3,182,552 | 5/1965 | Audy | 248/466 |
| 3,209,807 | 10/1965 | Ryner | 151/41.74 X |
| 3,428,915 | 2/1969 | Leone et al. | 350/252 X |
| 3,677,161 | 7/1972 | Jones | 350/255 |
| 3,704,658 | 12/1972 | Uesugi | 350/252 X |
| 4,023,891 | 5/1977 | Chadwick | 350/252 X |

FOREIGN PATENT DOCUMENTS

| | | | |
|---|---|---|---|
| 702376 | 2/1941 | Fed. Rep. of Germany | 350/255 |
| 610040 | 6/1978 | U.S.S.R. | 350/252 |

*Primary Examiner*—J. Franklin Foss
*Attorney, Agent, or Firm*—Thomas A. Briody; William J. Streeter; Algy Tamoshunas

[57] ABSTRACT

A precision adjusting system, comprising two components which can be adjusted with respect to each other, and at least two adjusting devices, each of which comprises a screw body which is mounted to be rotatable on the one component, a holder body which is rigidly mounted on the other component, and a plastically deformable torsion member which interconnects the two bodies.

Rotation of the screw body causes a relative displacement of the two components, the torsion member then being twisted and plastically deformed and the two components being fixed in the adjusted position at the same time.

4 Claims, 3 Drawing Figures

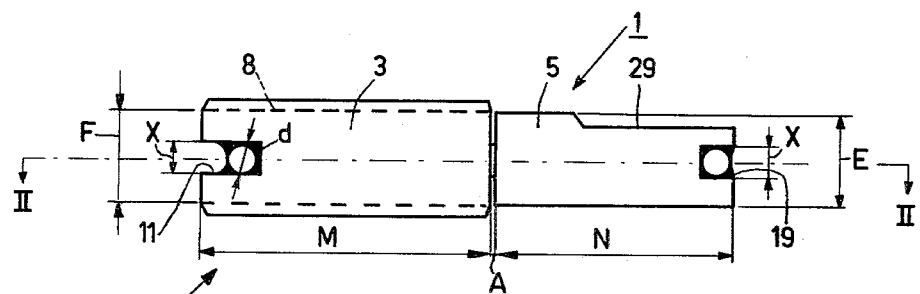
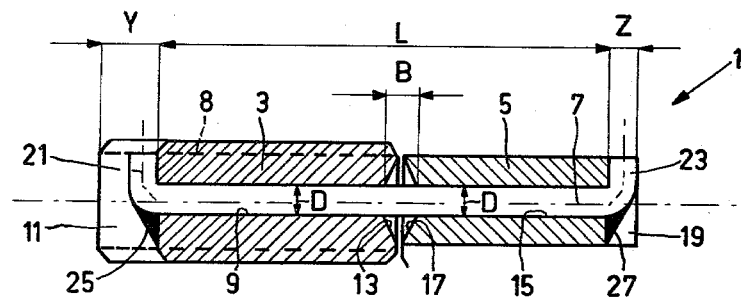
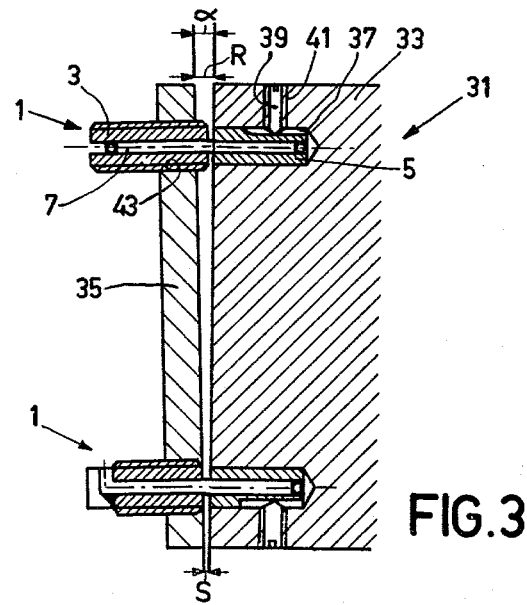

PRECISION ADJUSTING DEVICE

The invention relates to a precision adjusting device, comprising a screw body, a holder body, and a connecting member which can be deformed by rotation of the screw body.

Adjusting devices comprising an adjusting screw and a lock screw or lock nut are generally known; it is difficult to adjust these adjusting devices, because the adjustment realized by means of the adjusting screw is usually lost again by the tightening of the lock screw or lock nut.

The German magazine "VDI-Zeitschrift", No. 1, Jan. 1st, 1956, page 19, describes a precision adjusting device of the kind set forth in which the connecting member can be elastically deformed. This known device enables accurate adjustment, but an adjusting device of this kind is subject to stress and is susceptible to vibrations.

The object of the invention is to provide a precision adjusting device which simply and readily enables accurate, stress-free adjustment up to an order of magnitude of a few μm with little play, and which is not susceptible to vibrations.

This object in accordance with the invention, is achieved mainly in that the connecting member is constructed as an elongate torsion member which is made of a plastically deformable material, the ends of said member being connected to the screw body on the one side and to the holder body on the other side, the part of the torsion member situated between the two ends being twistable.

For accurate adjustment of two components to be adjusted with respect to each other by means of the precision adjusting device in accordance with the invention, the screw body and the holder body are rotatably and rigidly, respectively, connected to the two components. Because the torsion member acts as a comparatively rigid spacer, relative displacement of the two components to be adjusted takes place when the screw body is turned; at the same time, the torsion member is twisted and plastically deformed, so that the screw body as well as the two components are fixed in the adjusted position. Due to the plastic deformation of the torsion member, the adjustment is made without backlash. Preferably, the screw body is provided with a self-braking screw thread. The adjustment accuracy is co-dependent of the pitch of the screw body. Any length variations of the torsion member which are caused by the plastic deformation are automatically taken into account during the adjustment. The precision adjusting device in accordance with the invention enables and adjustment to be obtained which is very stable with time. The torsion member of a plastically deformable material has a damping effect on any vibrations.

The precision adjusting device in accordance with the invention is in principle intended for a non-recurrent adjustment. However, due to the elongate shape of the torsion member, it can be twisted a number of times in both directions within a given adjusting range, so that, for example, a completed adjustment and/or an incorrect adjustment can be corrected.

In a preferred embodiment of the precision adjusting device in accordance with the invention, the torsion member has a circular cross-section, the screw body and the holder body being provided with a bore in which the twistable part of the torsion member is accommodated with a slide fit. Due to the slide fit, on the one hand, a substantially play-free relative displacement of the torsion member with respect to the screw body and the holder body is possible, while, on the other hand, seizing up of the torsion member in a given adjusting range is prevented. Because the torsion member is accommodated in the bores, high stability in a direction transversely of the longitudinal direction of the torsion member is obtained and undesirable deformation or bending of the torsion member due to vibrations, shocks etc. is counteracted.

A further preferred embodiment of the precision adjusting device in accordance with the invention is characterized in that a clearance exists between the screw body and the holder body.

As a result of this step, a relative angular misalignment of the holder body and the screw body as well as a tilting movement of the components to be adjusted is possible.

The twistable part of the torsion member will then be partly clear, so that the torsion member is capable of taking up shearing forces occurring during adjustment as well as bending occurring during relative tilting movements of the components to be adjusted. Preferably, the free length of the clear part of the torsion member at the most equals the diameter.

In another preferred embodiment of the precision adjusting device in accordance with the invention, the torsion member is made of copper. In addition to having damping properties and plastic deformability, copper is comparatively rigid, so that the torsion member is capable of taking up comparatively high forces without undesired deformation, so that it can act as a support for the adjusting components.

The invention also relates to a precision adjusting system, comprising at least two components which can be adjusted with respect to each other and which are connected to each other by means of at least two precision adjusting devices in accordance with the invention. As a result of the use of two or three of the described adjusting devices, accurate, relative tilting movement, parallel movement and spatial movement of the two components is possible. In view of the comparatively high rigidity of the torsion members, they can also act as supports and as connecting members, the adjusting system being resistant to vibrations and light shocks.

The precision adjusting system in accordance with the invention can be used in singular or multiple form in a variety of precision apparatus for adjusting one or more components, for example, in optical apparatus for adjusting lenses, mirrors, prisms, in micromanipulators, etc.

If desirable or necessary, locking means can be used for protection against strong vibrations and shocks, said means being used to lock the components to be adjusted in the adjusted position.

Preferred embodiments in accordance with the invention will be described in detail hereinafter with reference to the accompanying diagrammatic drawing.

FIG. 1 is a side elevation of a precision adjusting device in accordance with the invention, FIG. 2 is a longitudinal sectional view, taken along the line II—II in FIG. 1, of the precision adjusting device;

FIG. 3 shows a precision adjusting system, comprising adjusting devices in accordance with the invention.

The precision adjusting device 1 shown in the FIGS. 1 and 2 comprises a screw body 3 of brass, a cylindrical holder body 5 which is also made of brass, and a rod-shaped or wire-shaped torsion member 7 which is made of a plastically deformable material, preferably copper. The screw body 3 is provided with a screwthread 8 and with a bore 9 which opens at one free end into a slit 11 and at its other end, facing the holder body 5, into a funnel-shaped recess 13. The holder body 5 comprises a bore 15 which opens into a funnel-shaped recess 17 at the end facing the screw body 3, and into a slit 19 at the other end. The bores 9 and 15 have the same diameter D. The width X of the slits 11 and 19 is substantially equal to the diameter D of the bores 9 and 15.

The depth Z of the slit 19 is substantially equal to the width X and the diameter D, whilst the slit 11 has a depth Y which is larger than the width X.

The torsion member 7 extends through the bores 9 and 11 and has a circular section with a diameter d such that it fits in the bores 9 and 15 with a slide fit. The two ends 21 and 23 are bent and connected to the screw body 3 and the holder body 5; in the embodiment shown, this is realized by a soldered connection 25 and 27, respectively, it being ensured that the solder does not penetrate into the bores 9 and 15. The slit 11 is not totally filled up by the bent end 21 of the torsion member 7, so that enough depth remains to enable turning of the screw body 3 by means of a screwdriver. The effective length L of the twistable part of the torsion member 7 which is situated between the two bent ends 21 and 23 is approximately equal to from 10 to 15 times the diameter d. The length M of the screw body 3 and the length N of the holder body 5 are proportioned so that the facing ends of the two bodies are situated at a clearance A from each other. The recesses 13 and 17 are proportioned so that the torsion element 7 is clear over a free length B approximately equal to the diameter d.

The holder body 5 also comprises a flat portion 29. Preferably, the holder body 5 has a diameter E which at the most equals the core diameter F of the screwthread 8.

The operation of the adjusting device 1 will be described in detail hereinafter with reference to FIG. 3 which is a diagrammatic sectional view of a precision adjusting system 31, comprising a block 33, a plate 35 which can be adjusted with respect to the block 33, and two adjusting devices 1.

Each adjusting device 1 is accommodated, by way of the holder body 5, in a bore 37 in the block 33 and is secured therein, for example, by means of an adjusting screw 39 which is screwed against the flat portion 29 of the holder body 5 via a threaded hole 41. The screw body 3 is accommodated in a threaded hole 43 of the plate 35. For assembly, the holder body 5 can be inserted through the threaded hole 43. The block 33 and the plate 35 are fixed in a given position with respect to each other by means of the adjusting devices 1, the torsion members then serving as spacers and as supports for the plate 35.

If the position of the plate 35 is to be changed with respect to the block 33 or if precision adjustment is required following a coarse preadjustment, at least one of the two screw bodies 3 is turned by means of a screwdriver; the relevant holder body 5 is then retained by the adjusting screw 39, together with the end 23 of the torsion member 7 and further rotation thereof is prevented, whilst the other end 21 of the torsion member 7 rotates with the screw body 3. As a result, the torsion member 7 is twisted and the plate 35 is at the same time displaced with respect to the block 33 by the screw body 3.

By suitable adjustment of the two adjusting devices 1, the plate 35 can be tilted or can be spatially displaced, the angular position remaining the same, for which adjustments the distances R and S and/or the angle $\alpha$ can be accurately adjusted to the desired value. The use of a third adjusting device 1 further increases the possibilities of adjustment.

Thanks to the part of the torsion member 7 which is clear over the free length B, shearing forces and bending occurring during adjustment can be taken up.

The use of copper for the torsion member is particularly advantageous, because copper combines a hysteresis-free plasticicity with a comparatively high rigidity. It has been found that copper can be twisted once over a length approximately equal to the diameter without fracturing occurring. For a length L of the twistable part which is equal to from 10 to 15 times the diameter d, the torsion member 7 can be twisted to and fro at least 10 times, i.e. the screwbody 5 can also perform ten revolutions to and fro. When the pitch of the screwthread is large, the maximum adjustment step of the plate 35 is comparatively large, whilst in the case of a small pitch of the screwthread, a very small adjustment step of the plate 35 in the order of magnitude of a few $\mu m$ is possible.

Using a practical embodiment of a precision adjustment system in accordance with the invention, a prism was adjusted with an accuracy of $\pm 3$ $\mu m$ by means of three adjusting devices having the following characteristics:

Material of screw body: brass
Material of holder body: brass
Length M of screw body: 8 mm
Length N of holder body: 7 mm
Screwthread 8: M4×0.5
Pitch of screwthread: 0.5 mm
Diameter of screw body: 4 mm
Core diameter F of screw body: 3.2 mm
Diameter E of holder body: 3 mm
Diameter d of torsion members: 1 mm
Length of twistable part L: 12.5 mm
Clearance A: 0.5 mm
Free length B: 1 mm.

For locking the holder body 5, use can be made of means other than the adjusting screw 41, for example, adhesives, a setting rubber compound, etc.

The screw body 3 and the holder body 5 of the described embodiment are made of brass; any length variation due to temperature variations can be compensated for by using copper also for the holder body and the screw body.

The adjusting device in accordance with the invention can be simply adapted to the weight, the volume and the dimensions of the components to be adjusted by a suitable choice of the dimensions of the individual members of the adjusting device. The requirements as regards the desired adjusting range and the required adjusting tolerance can be satisfied by a suitable choice of the screwthread of the screw body.

What is claimed is:

1. A precision adjusting device, comprising a screw body, a holder body and a connecting, elongated torsion member which can be deformed by rotation of the screw body, the torsion member being made of a plastically deformable material, the ends of said member being connected to the screw body on the one side and to the holder body on the other side, the part of the torsion member situated between the two ends being twistable.

2. A precision adjusting device as claimed in claim 1, wherein the torsion member has a circular cross-section, the screw body and the holder body being provided with a bore in which the twistable part of the torsion member is accommodated with a slide fit.

3. A precision adjusting device as claimed in claim 1 or 2, wherein a clearance exists between the screw body and the holder body.

4. A precision adjusting device as claimed in claim 1 wherein the torsion member is made of copper.

* * * * *